United States Patent
Bantz et al.

(10) Patent No.: US 7,694,192 B2
(45) Date of Patent: Apr. 6, 2010

(54) ASSISTED PROBLEM REMEDIATION

(75) Inventors: David F. Bantz, Portland, ME (US);
Thomas E. Chefalas, Somers, NY (US);
Srikant Jalan, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/751,257

(22) Filed: May 21, 2007

(65) Prior Publication Data

US 2008/0294931 A1    Nov. 27, 2008

(51) Int. Cl.
*G06F 11/00* (2006.01)

(52) U.S. Cl. .................................. 714/57; 714/26
(58) Field of Classification Search .................. 714/26, 714/57

See application file for complete search history.

(56) References Cited

U.S. PATENT DOCUMENTS

| | | | |
|---|---|---|---|
| 5,666,481 A * | 9/1997 | Lewis | 714/4 |
| 6,571,236 B1 | 5/2003 | Ruppelt | |
| 6,829,734 B1 * | 12/2004 | Kreulen et al. | 714/46 |
| 7,073,093 B2 * | 7/2006 | Mannarsamy | 714/25 |
| 7,200,774 B2 * | 4/2007 | Vollmar et al. | 714/26 |
| 7,500,145 B2 * | 3/2009 | Wright et al. | 714/26 |
| 2003/0028823 A1 * | 2/2003 | Kallela et al. | 714/26 |
| 2004/0243532 A1 * | 12/2004 | Steward | 706/57 |
| 2005/0102571 A1 * | 5/2005 | Peng et al. | 714/26 |
| 2006/0095474 A1 * | 5/2006 | Mitra et al. | 707/104.1 |
| 2007/0288795 A1 * | 12/2007 | Leung et al. | 714/26 |
| 2008/0065577 A1 * | 3/2008 | Chefalas et al. | 706/47 |
| 2008/0288821 A1 * | 11/2008 | Aaron | 714/26 |

OTHER PUBLICATIONS

WS-BPEL 2.0 Tutorial Oct. 13, 2005.*

* cited by examiner

*Primary Examiner*—Michael C Maskulinski
(74) *Attorney, Agent, or Firm*—Ryan, Mason & Lewis, LLP

(57) ABSTRACT

A method (which can be computer implemented) for assisted remediation of at least one problem with a computer system includes the steps of obtaining data from the computer system, the data being indicative of the at least one problem; hypothesizing at least a first candidate remediation process for the problem from among a plurality of annotated remediation process descriptions, based at least in part on the data; associating at least a first attribute with the at least first candidate remediation process; and facilitating presentation of the at least first candidate remediation process with the associated attribute to a remediation agent.

21 Claims, 8 Drawing Sheets

```
<flow>                                    50
    <sequence>                            51
        <invoke> ... </invoke>            52
        <invoke> ... </invoke>            53
        <switch>                          54
            <case condition=somecondition> ... </case>        55
            <case condition=someothercondition> ... </case>   56
            <otherwise> ... </otherwise>
        </switch>                                             57
    </sequence>
</flow>
```

| step | changes element | change assessment |
|------|-----------------|-------------------|
| 52   | 30, 36          | low               |
| 53   | none            | N/A               |
| 55   | 38              | low               |
| 56   | 38              | low               |
| 57   | 38              | low               |

(60) step  (61) changes element  (62) change assessment

| attribute 80 | type 81 |
|---|---|
| cost | numeric |
| time | numeric |
| risk | numeric |
| scope of change | pictorial |

FIG. 10

| number 82 | attribute type 83 | UI type 84 |
|---|---|---|
| 1 | numeric | graph-based |
| 1 | pictorial | pictorial |
| 2 | numeric | graph-based |
| >2 | numeric | tabular |

FIG. 11

ASSISTED PROBLEM REMEDIATION

FIELD OF THE INVENTION

The present invention relates to the maintenance of computers. In particular, it relates to selecting from among several possible problem remediation processes for computers experiencing problems.

BACKGROUND OF THE INVENTION

Computers require maintenance, as do most complex systems. When problems occur with their hardware or software, several steps must be taken:

1. The problem must be detected.
2. Information about the problem must be gathered.
3. A provider of maintenance actions must be identified.
4. The information must be transmitted to the provider.
5. The provider must determine one or more possible courses of action.
6. The provider must select a course of action and take it.

One or more embodiments of the present invention relate to step 6, specifically to the selection of the course of action to be taken from a set of one or more than one possible courses of action.

Step 1, the detection of a problem, can be performed by hardware, software or by a human user who observes behavior typical of a problem. Steps 2-5 can be similarly performed by hardware, software or by one more human users or maintenance personnel. In current practice, step 5 is often performed by a human operator at a help desk, located remotely from the site of the problem. This operator interacts with a human user, located proximately to the computer with the problem. The help desk operator asks the user a relies of questions and directs the user to perform a series of actions, these questions and actions being directed to obtaining the most accurate diagnosis possible of the problem. Alternatively, a second computer equipped with diagnostic software may interact directly with the computer with the problem, similarly obtaining data and pet forming actions on the problem computer, with the goal of obtaining the most accurate diagnosis possible of the problem.

Once this diagnosis is obtained, whether by computer-to-computer interaction or by interactions between humans, it now remains to determine a problem remediation process. Often there are multiple ways in which this problem can be fixed. These may be variations of a single way, or completely different ways. As an example, it may be the case that a given computer has an application program that is not mentioning correctly. One remediation procedure may be to uninstall and then reinstall that application program, while another may consist of a possibly complex sequence of steps to edit information in the computer operating system's registry, as in the Microsoft Windows® XP operating system (registered mark of Microsoft Corporation, Redmond, Wash. USA).

Whether the agent designated to fix the problem is human or otherwise, that agent must select among the candidate problem remediation processes. The criteria used in this selection are various, including simplicity, risk, effectiveness, speed, the scope of change and cost, among others. Whatever the chosen criteria, each candidate remediation process must have associated data that allow for comparison with other remediation processes using the selected criteria. In current practice, human agents often make their decisions in the absence of this data, or on the basis of their episodic knowledge of the characteristics of remediation processes that they have personally observed. Reliance on personal observation does not permit the sharing of knowledge among human agents, limiting the improvements possible in an organization responsible for problem remediation.

U.S. Pat. No. 6,571,236 to Ruppelt discloses a method and apparatus for problem diagnosis and solution. In particular, a method for problem diagnosis based on queries received from remote locations includes the steps of determining applicable solution recommendations based on a diagnosis query, displaying the applicable solution recommendations on a screen of a remote terminal, and determining whether a case based reasoning tool is available to answer the diagnosis query. When the case based reasoning tool is available, the method presents the case based reasoning tool on the screen with the applicable solution recommendations.

US Patent Application Publication 2004/0243532 of Steward discloses a method and apparatus/software to assist persons in complex cause-and-effect reasoning. In particular, the method is directed to generating, refining and determining the consequences of complex systems of multiple cause and effect relationships. The method of Steward is applicable to biological systems as well as man-made systems, as it is based on the collecting and using observed behaviors as well as previous understood mechanism or relationships. The method is particularly useful in multi-variable system with significant interactions among sub-components, especially when there is limited expertise or complete understanding of all the components and their respective relationships interactions. In these cases the method provides guidance for future experiments that develop further expertise. The method has particular power and benefit as it provides for a distinction and comparison of the merits of conducting further experiments based on defined criteria. For example alternative solutions or experiments can be suggested and distinguished on the basis of cost, delay or a negative or detrimental outcome, based on prior experience and knowledge of interactions, in contrast to those that provide additional insight or solve the problem with a lower risk of negative implications.

US Patent Application Publication 2006/0095474 of Mitra et. al. discloses a system and method for problem solving through dynamic/interactive concept-mapping. A computer-implemented method of problem solving includes graphically displaying a plurality of concepts, dynamic links between the concepts, and solving a problem based on the displayed concepts and dynamic links. Other embodiments include: a computer-readable medium having instructions thereon for causing a suitably programmed information-processing apparatus to perform a method of the problem solving that includes graphically displaying a plurality of concepts, displaying dynamic links between the concepts, and solving a problem based on the displayed concepts and dynamic links. Still other embodiments include a computerized apparatus that includes a display output unit, a display drive unit that causes a plurality of concepts to be displayed on the display unit, and that causes dynamic links between the concepts to be displayed, and a solution unit that solves a problem based on the displayed concepts and dynamic links, and that displays the solution.

It would be desirable to overcome the limitations in previous approaches.

SUMMARY OF THE INVENTION

Principles of the present invention provide techniques for assisted remediation of at least one problem with a computer system. In one aspect, an exemplary method (which can be computer implemented) includes the steps of obtaining data from the computer system, the data being indicative of the at least one problem; hypothesizing at least a first candidate remediation process for the problem from among a plurality of annotated remediation process descriptions, based at least in part on the data; associating at least a first attribute with the at least first candidate remediation process; and facilitating presentation of the at least first candidate remediation process with the associated attribute to a remediation agent.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps.

One or more embodiments of the invention described herein exploit computer-readable information about remediation processes to compute data about each process, that data being relevant to choice criteria. Once this data has been computed, it can be presented to the remediation agent to facilitate a quick, complete, effective choice among candidate problem remediation processes.

These and other features, aspects, and advantages of the present invention will become apparent from the following detailed description of illustrative embodiments thereof, which is to be read in connection with the accompanying drawings.

BRIEF DESCRIPTION OF THE DRAWINGS

FIG. 10 illustrates an exemplary attribute type table;

FIG. 11 illustrates an exemplary Choice UI type preferences table; and

DETAILED DESCRIPTION OF PREFERRED EMBODIMENTS

One or more embodiments of the invention provide data to a remediation agent, either human or non-human, the data quantitatively characterizing each of a set of candidate remediation processes by quantifying the values of certain chosen attributes of the processes. One or more embodiments of the invention determine the values of the attributes automatically through analysis of information descriptive of the processes, especially processes represented in a formal process-description language such as WS-BPEL. WS-BPEL is an XML-based language for process description standardized by the Organization for the Advancement of Structured Information Standards (OASIS), a not-for-profit international consortium for the development of e-business standards. WS-BPEL version 2.0 was approved as a standard in April 2007. The version 2.0 standard is available in the portable document format on the Internet at:

http://docs.oasis-open org/wsbpel/2.0/wsbpel-specification-draft.pdf.

WS-BPEL represents a process as a series of steps, together with information about how the next step is chosen when the current step completes. In one or more embodiments of the present invention, each substantive step is characterized by a set of attributes expressed quantitatively. An example of an attribute is an estimate of the time taken by that step WS-BPEL is extensible (as set forth in detail in the referenced specification and familiar to the skilled artisan) so that all of the attributes can be represented in an appropriately extended version of WS-BPEL.

Given the WS-BPEL of a process, together with certain statistical measures of next-step choice (which can also be represented as extensions to the base WS-BPEL standard) a summary value of each attribute can be computed. These summary values can then be presented to the remediation agent to assist in the correct choice of remediation process. Other process description languages exist. One is IBM's FDL. While use of WS-BPEL is set forth in the exemplary embodiment herein, the invention is not limited to WS-BPEL and the skilled artisan will appreciate that other choices of process description language are possible.

Figure 1:
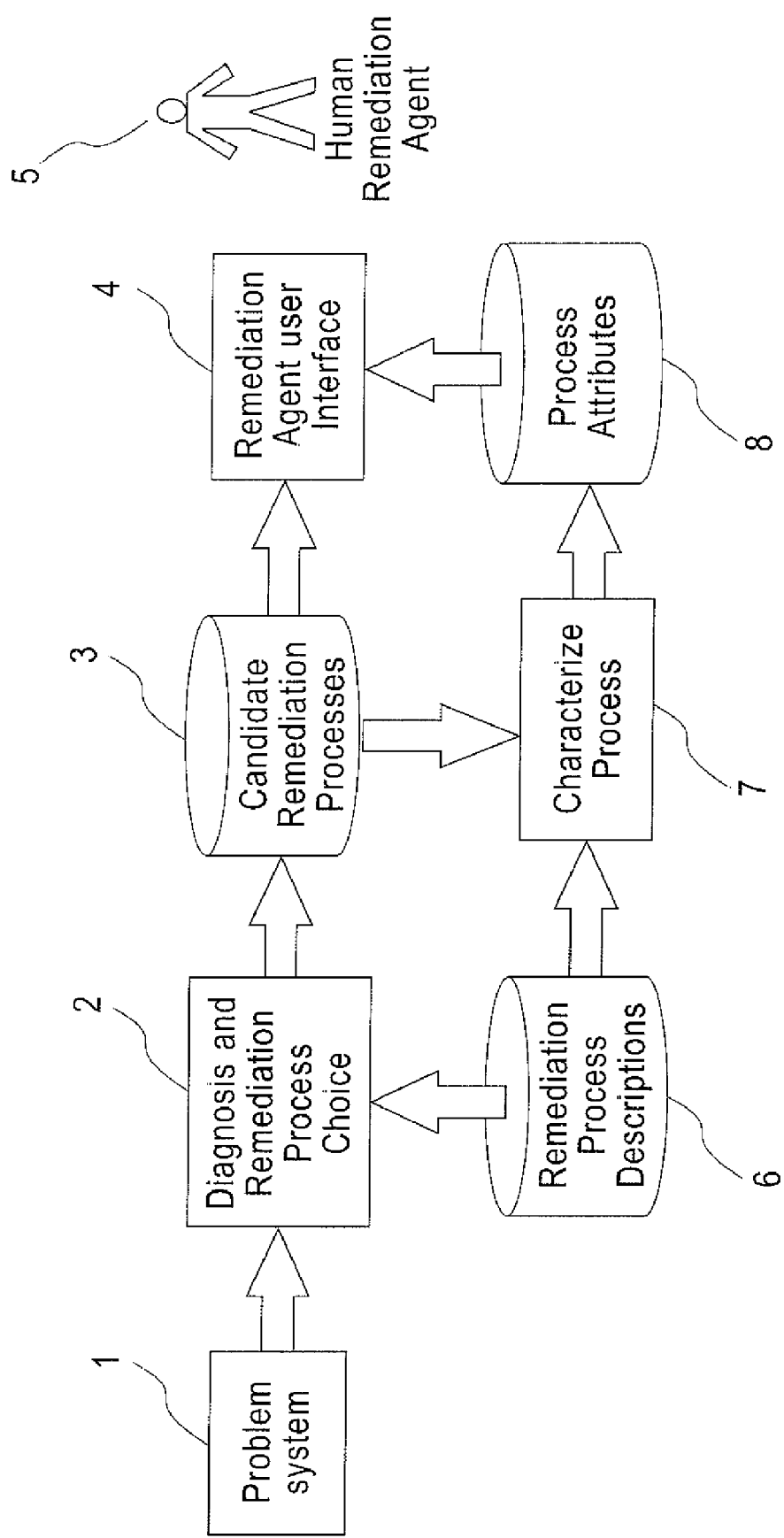
FIG. 1 illustrates the overall configuration of an exemplary system according to an aspect of the invention.

A preferred, non-limiting exemplary embodiment of the invention will now be described. FIG. 1 shows the overall configuration of the exemplary preferred embodiment of the invention as an abstract data flow diagram, in which arrows represent the act of accessing data from a device or computer program. Problem system 1 is a computer system, possibly an entire network of computer's and other devices, observed to have some form of hardware or software problem. This observation may be made by a human user or monitoring software, not shown Diagnosis and Remediation Process Choice 2 includes a human and/or a non-human agent capable of communicating with problem system 1, obtaining relevant data from it, and hypothesizing one of more candidate remediation processes, chosen from a collection of remediation process definitions stored on storage device 6. The resulting candidate remediation processes are stored on storage device 3. Preferably, the process descriptions stored on storage device 6 are represented as annotated WS-BPEL, whereas the candidate remediation processes stored on storage device 3 are simply identified by name or by some other reference. The set of candidate remediation processes 3 can be chosen by known techniques.

The exemplary preferred embodiment of the invention preferably includes software running on a computer, shown as Characterize Process 7, which creates a collection of process attributes shown as stored on storage device 8. The collection of process attributes includes the values of one or more process attributes associated to each of the candidate remediation processes shown as stored on storage device 3. Thus, for example, the time to perform a process would be stored on storage device 8 foil each of the candidate remediation processes stored on storage device 3. The exemplary preferred embodiment of the invention also includes appropriate hardware and/or software for the display of the attributes of each candidate remediation process on remediation agent user interface 4, subsequently used by remediation agent 5 to select among the candidate remediation processes.

Remediation agent user interface 4 preferably presents candidate choice(s) in a manner so as to make the choice simple and effective. If only one remediation process is a candidate, the choice that the remediation agent must make is whether to use that process or not. It may be that the cost or risk involved in performing the process is unacceptable, and that the remediation agent will choose not to fix the problem with that process, but will pursue other alternatives outside the scope of the system described.

Given the description of FIG. 1, it will be appreciated that an exemplary inventive method for assisted remediation of at least one problem with a computer system can include the steps of obtaining data from the computer system, the data being indicative of the at least one problem (FIG. 1 flow from block 1 to block 2); and hypothesizing at least a first candidate remediation process for the problem (FIG. 1 flow from block 2 to block 3) from among a plurality of annotated remediation process descriptions, based at least in part on the data. The method can further include associating at least a first attribute with the at least first candidate remediation process (flow from block 7 to block 9); and facilitating presentation of the at least first candidate remediation process with the associated attribute to a remediation agent (flow from block 4 to block 5). As used herein, "facilitating" an action includes performing the action, making the action easier, helping to carry the action out, or causing the action to be performed.

Of course, in the method just described, several candidate remediation processes can be presented, such that the hypothesizing step further comprises hypothesizing at least a second candidate remediation process for the problem; the associating step further comprises associating at least a first attribute with the at least second candidate remediation process; and the facilitating step comprises facilitating presentation of the at least second candidate remediation process with the associated attribute. In this case, the additional step of obtaining a selection of one of the first candidate remediation process and the second candidate remediation process, based on the presentation, can be performed. Further, in one or more instances, each candidate process has at least two attributes. Thus, the associating step may further comprise associating at least a second attribute with the first candidate remediation process and at least a second attribute with the second candidate remediation process.

The remediation agent can be a human remediation agent, and the facilitating presentation can be facilitating display to the human agent. An additional step can include obtaining, from the human remediation agent 5, an attribute selection for display. The first and second attributes associated with the first candidate remediation process and the first and second attributes associated with the at least second candidate remediation process can be, for example, cost, time, risk, and scope of change. The step of facilitating display can include, for example, facilitating display in one of a text-based form, a graph-based-form, and a pictorial form, based at least in part on the attribute selection by the human remediation agent, as will be discussed in greater detail hereinafter.

In some instances, a step of annotating the remediation process descriptions can be performed when initially adding the descriptions to database 6. In another approach, a step of annotating the remediation process descriptions can be performed when a given one of the descriptions is selected as (one of) the candidate remediation process(es) 3. As noted elsewhere herein, in some instances, only a first candidate remediation process 3 is hypothesized and presented, and human remediation agent 5 simply decides whether to implement the candidate remediation process, based at least in part on the display.

Figures 2, 3:
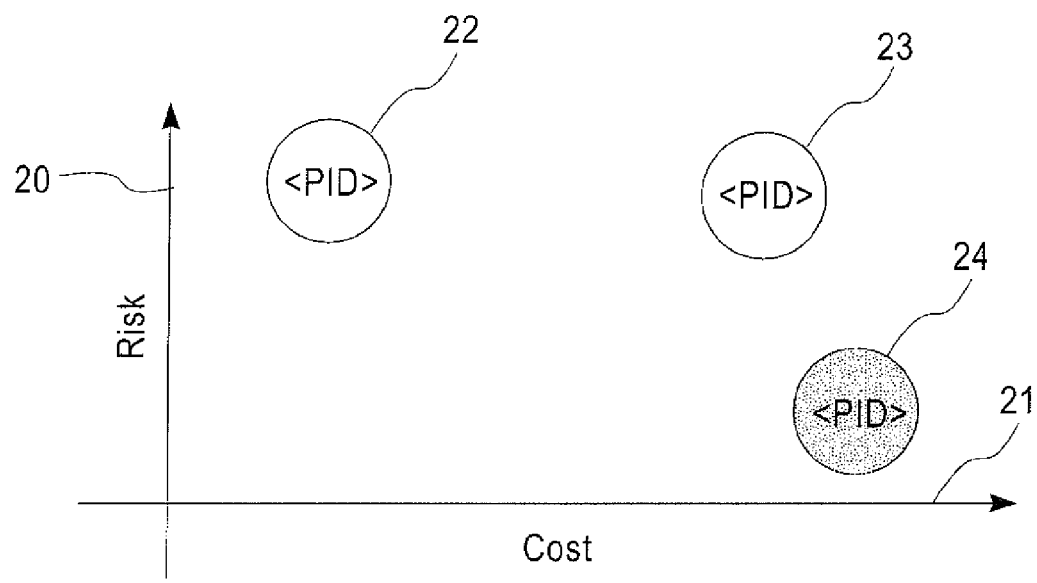
FIG. 2 illustrates an exemplary text-based user interface appropriate to some forms of process choice, according to another aspect of the invention.
FIG. 3 illustrates an exemplary graph-based user interface appropriate to tradeoff-style forms of process choice, according to yet another aspect of the invention.

FIG. 2 shows a user interface control (a "combo box" 10) appropriate for some forms of process choice. Shown in the figure are five candidate processes: Windows® System Restore, Windows® Registry Edit, Application reinstall, New Application Version and Alternate Application. The indicated marks are registered marks of Microsoft Corporation, Redmond, Wash., USA. The New Application Version 11 is shown highlighted to indicate that the remediation agent has selected it. Note that for each alternative process choice, four attributes are shown: the unique process identifier <PID>, the estimated time to perform the process <time>, an estimate of the risk inherent in the process <risk> and comments <comments> concerning the process. The comments field can advantageously contain ancillary information about the process, for example, indicating that the last time it was invoked it did not perform as expected. FIG. 2 is appropriate for process choice when the process attributes can be represented as numeric quantities, easily compared by the remediation agent.

FIG. 3 shows a user interface based on a two-dimensional graph. In the figure, the vertical axis of the graph 20 represents an estimate of the risk in performing the process, while the horizontal axis 21 represents the cost of performing the process. Three candidate processes 22, 23 and 24 awe shown as circles, each with a unique process id Process 22 is high-risk and low-cost; process 23 is high risk and high-cost, while process 24, shown as selected, is low-risk but high cost This form of user interface is appropriate when a tradeoff exists between two attributes. If fewer or more attributes must be considered in order to make a good choice, this form of user interface is less appropriate, although it can be combined with a textual user interface as shown in FIG. 2 to display the other attributes.

Figure 4:
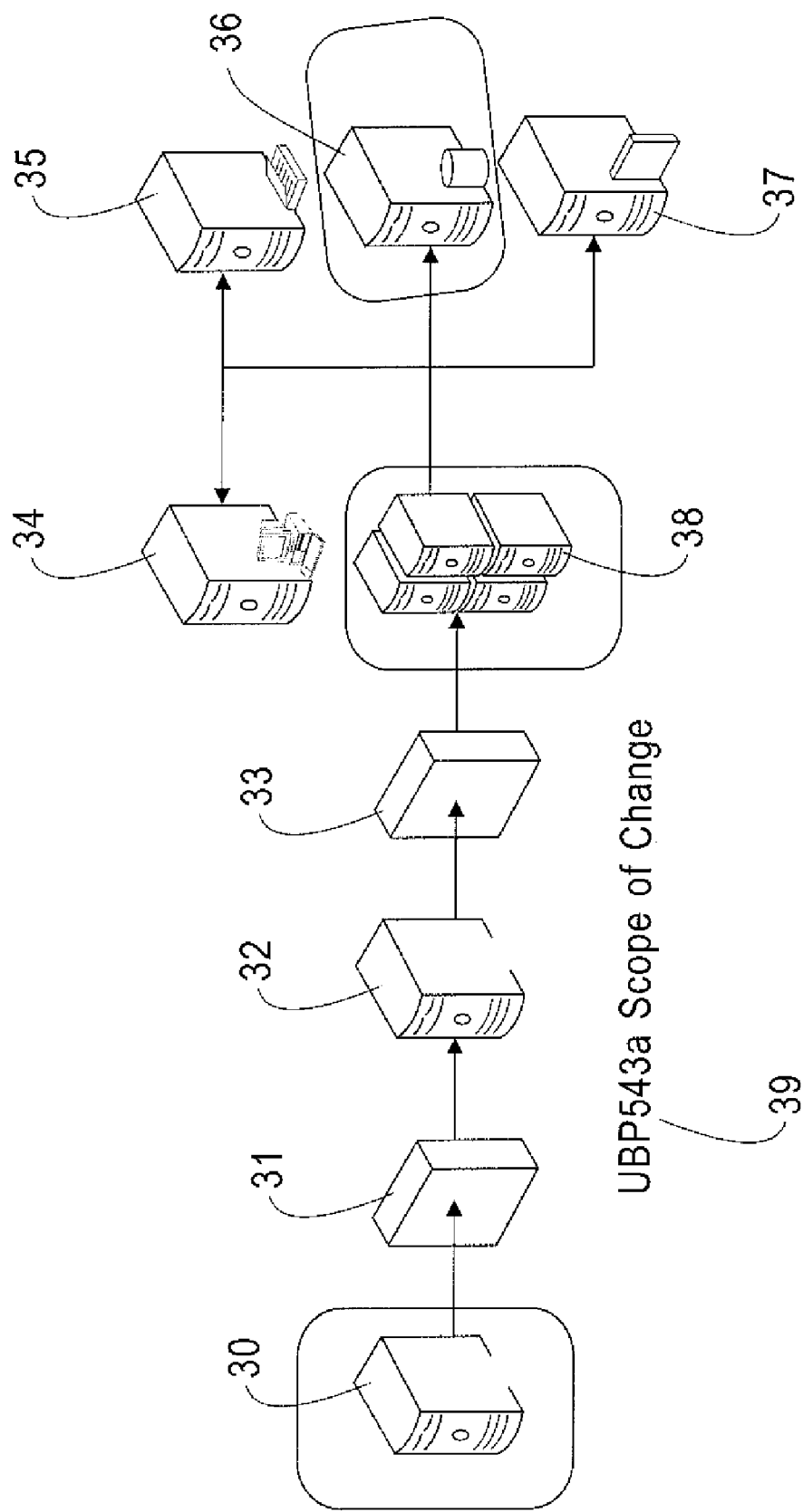
FIG. 4 illustrates an exemplary inventive pictorial user interface appropriate to scope-of-change style forms of process choice for a first process.
Figure 5:
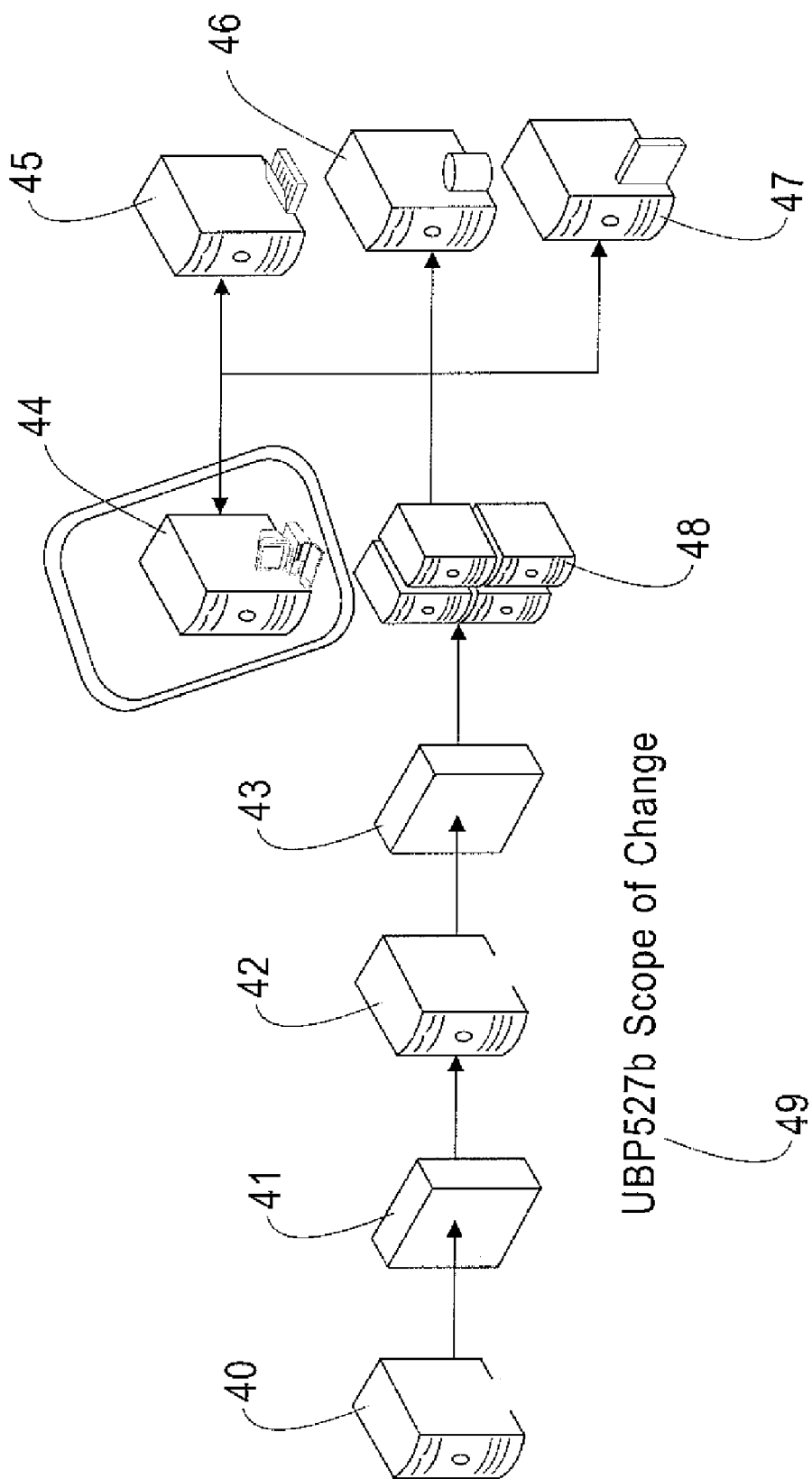
FIG. 5 illustrates the exemplary inventive pictorial user interface appropriate to scope-of-change style forms of process choice for a second process.

FIG. 4 shows a form of pictorial user interface appropriate to a choice of remediation processes, where the scope of change is a key attribute. The figure shows a network diagram, which may be highlighted in such a way that network elements affected somewhat by the candidate remediation process are highlighted in an appropriate manner, as are servers 30, 36 and 38 in FIG. 4. For purposes of illustrative convenience, the highlighting is indicated in the figure as enclosure within an oblong border. However, it is presently believed preferable that color be employed; thus, the servers 30, 36 and 38 enclosed in oblongs could preferably be highlighted by appropriate coloration (for example, colored in yellow). The remediation process is identified by identifier 39 Servers 32, 34, 35 and 37 and firewalls 31 and 33 are not affected by the execution of the given remediation process FIG. 5 shows the scope of change for a different remediation process, whose identifier is 49. Here, only server 44 is affected, although the change strongly affects this server, as a more pronounced form of highlighting indicates. For purposes of illustrative convenience, the more pronounced highlighting is indicated in the figure as enclosure within a double oblong border. However, it is presently believed preferable that color be employed; thus, the server 44 enclosed in the double oblong could preferably be given more pronounced highlighting by appropriate coloration (for example, colored in red). All other network elements remain unchanged by this remediation process. This process may be preferred to that of FIG. 4 because server 44 is known by the remediation agent to be a management server, and its failure (as a result of a failure of the remediation process) would be less disruptive than the possible failures of servers 30, 36 and 38. The user interface illustrated in FIGS. 4 and 5 is an effective way to communicate the consequences of the candidate remediation processes. In other words, the remediation agent can easily see what the consequences of his or her choice might be. It will of course be appreciated that color-coding is but one manner in which items can be highlighted.

Now that the exemplary forms of a user interface have been described, the exemplary embodiment of the invention can be further understood through a detailed description of the two procedures 4 and 7 of FIG. 1. Procedure 7 analyzes annotated process descriptions 6 in order to compute the desired attributes of candidate processes. This computation can be performed once, at the time a new process description is added to the library 6, or can be performed at the time a given remediation process becomes a candidate. The description below applies in either case.

Figures 6, 7, 8:
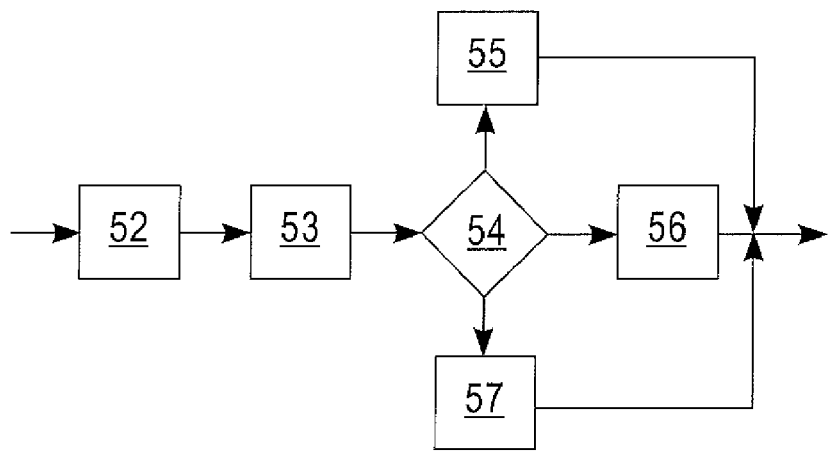
FIG. 6 illustrates the structure of an exemplary inventive flow in WS-BPEL.
FIG. 7 shows a flow chart corresponding to FIG. 6.
FIG. 8 shows a Scope of Change Table for the flow in FIG. 6.

FIG. 6 illustrates the form of part of a WS-BPEL document containing the control of the sequencing of activities WS-BPEL may be understood from the above-referenced standard, or from a reference text known to the skilled artisan, such as "Building Web Services with Java, $2^{nd}$ Edition," S. Graham et al., ISBN 0-672-32641-8, Sams Publishing, Indianapolis, Ind., 2005. Shown in the figure is one of the elements of a WS-BPEL document, the flow element 50. This element contains a sequence element 51 which, in turn, contains two invoke elements 52, 53 and a switch element 54. The switch element 54 contains two case elements 55, 56 and an otherwise element 57. This WS-BPEL flow is intended to represent the activity flow shown in FIG. 7. In FIG. 7, each box is labeled according to the corresponding element in FIG. 6. For example, switch element 54 of FIG. 6 corresponds to the diamond-shaped decision box with the label 54 in FIG. 7.

Now referring to FIG. 6, it can be seen that the time taken to execute this flow is the sum of three times: the first being the time to execute the invoke activity 52, $t_{52}$, the second being the time to execute the invoke activity 53, $t_{53}$, and the third being the time to execute the switch primitive 54. The time to execute the switch primitive 54 will vary depending on the truth or falsity of the conditions in the case elements 55, 56. For illustrative purposes we assume that the time wanted is the maximum time to execute the switch primitive 54, which is the maximum of three times: the time to execute the case element 55, the time to execute the case element 56, and the time to execute the otherwise element 57. If, for example, we wanted the average time to execute the switch primitive 54 we would first have to determine the relative frequency of execution of the two case elements and the otherwise element Given that the element execution times can be represented as $t_{55}$, $t_{56}$ and $t_{57}$ and that their relative frequencies are represented as $f_{55}$, $f_{56}$ and $f_{57}$, the average time is just $f_{55}t_{55}+f_{56}t_{56}+f_{57}t_{57}$ So we can calculate the average and maximum times to execute the flow in FIG. 6 as:

$$\text{Average time}=t_{52}+t_{53}+f_{55}t_{55}+f_{56}t_{56}+f_{57}t_{57} \quad (1)$$

$$\text{Maximum time}=t_{52}+t_{53}+\text{Max}(f_{55}t_{55}, f_{56}t_{56}, f_{57}t_{57}) \quad (2)$$

Other attributes of the process whose flow is shown in FIG. 7 can be computed in an analogous manner. For example, average and maximum cost and average and worst-case risk can be computed in this way, if the risk is quantified as the relative frequency of failure e of each process element.

Of particular interest is the scope of change attribute, shown pictorially in FIGS. 4 and 5 for two different processes. The scope of change expresses the degree to which the process changes each of a plurality of network elements. A pessimistic estimate of the scope of change of two process steps acting on the same network element is obtained by summing a quantitative measure of the individual changes applied. This is pessimistic because the change imposed by a subsequent process step may partly involve changes imposed by a previous process step. The computation of scope of change for the process whose flow is shown in FIG. 7, assuming that the scope of change is depicted in FIG. 4 is an exemplary illustrative case.

The scope of change for the process whose flow is shown in FIG. 7 can be determined with reference to a scope of change table, shown for example in FIG. 8. This table has three columns: the step column 60 contains an identification of the process step to which this table row applies; the changes element column 61 identifies which network elements in FIG. 4 are affected by the given process step, and the change assessment column 62 assesses whether the change imposed by that process step is low, medium or high. In a more-detailed assessment of scope of change, column 62 may refer to which components of the given network elements are affected, or even how they ale affected As an example, consider row 1 of the scope of change table of FIG. 5. This row expresses the consequence of step 52 as being low changes to both elements 30 and 36 of FIG. 4.

Figure 9:
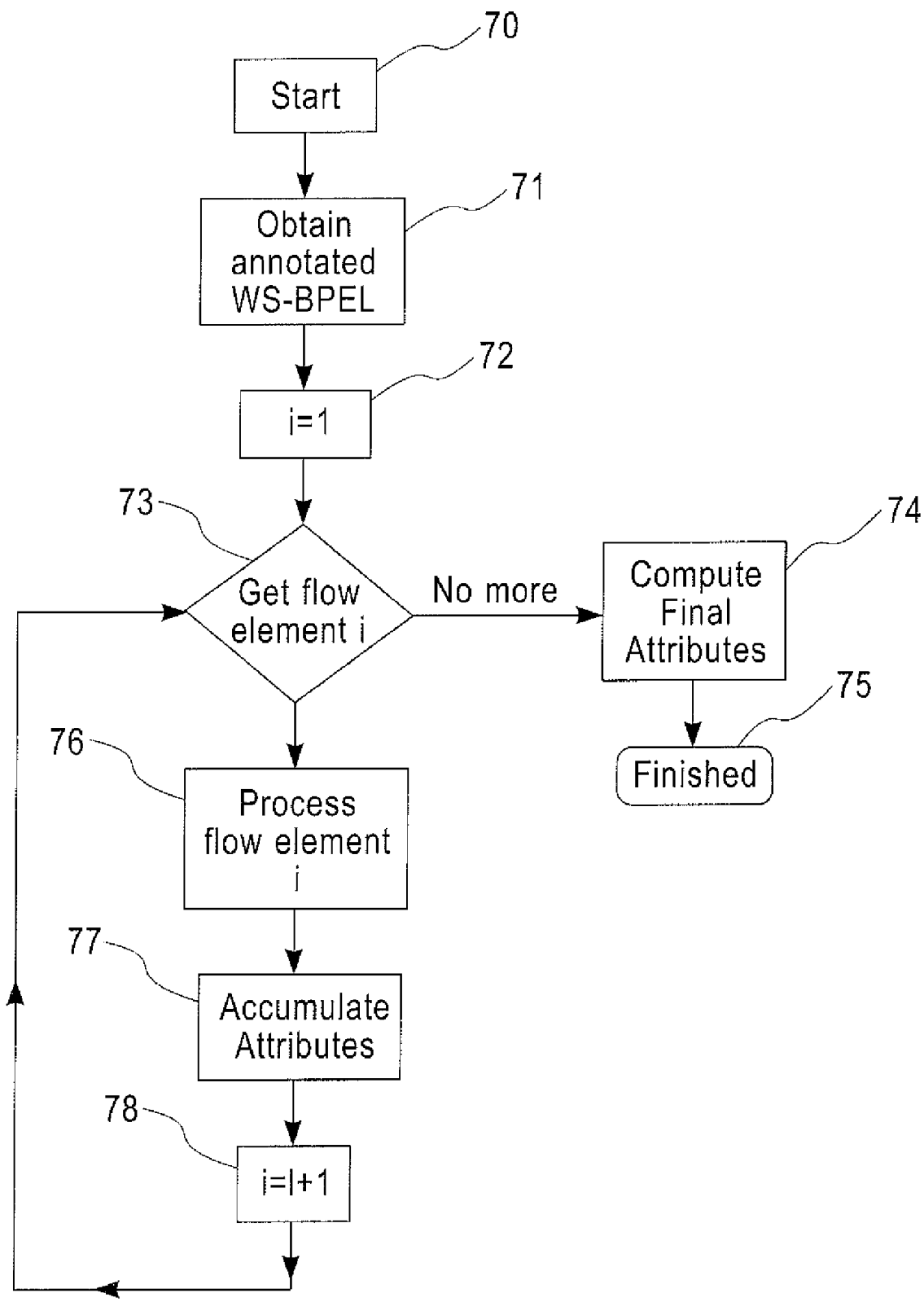
FIG. 9 is a flow diagram of an exemplary embodiment of Characterize Process software, according to a further aspect of the invention.

FIG. 9 shows an exemplary flow diagram for the Characterize Process software 7 of FIG. 1. This flow begins in block 70 and continues to block 71, where the annotated WS-BPEL representation of the process to be characterized is obtained The annotation consists of step attributes, a scope of change table, and any other data relevant to the characterization process. The flow continues with block 72, which initializes an index. Decision block 73 obtains the i-th flow element. If there is no i-th element, block 73 exits to block 74 which computes the process attributes in a manner previously described. Block 74 then exits to block 75, which terminates the Process Characterization flow.

If decision block 73 does find an i-th flow element, it exits to block 76. Block 76 retrieves the attributes from the i-th flow element, if possible. In the case of the switch element 54 of FIG. 6, where those attributes are not known, the computation is mote complex. If the invoke elements 52 and 53 of FIG. 6 were to sub-processes, as is possible in WS-BPEL 2.0, similarly, the computation is mole complex Discussion of this case is deferred until FIG. 9 has been described.

Upon processing the i-th flow element in block 76, program flow exits to block 77 where the attributes are accumulated for later computation in block 74 Then block 77 exits to block 78 which updates the index and exits to decision block 73.

The complex case element processing in block 76 requires that a sub-flow, contained within an element, be characterized. This sub-flow characterization process is identical to that of FIG. 9, except that the WS-BPEL is already available for analysis. Thus the complex case element processing in block 76 is just a recursive invocation of the software represented in FIG. 9, with minor modifications that will be readily apparent to those skilled in the art, given the teachings herein.

Given the description of FIG. 9, it will be appreciated that in one or mote embodiments, the exemplary method steps presented above following the description of FIG. 1 can, in some instances, include additional steps as well. For example, additional steps can include representing a plurality of problem remediation processes in computer-interpretable form to obtain a plurality of representations each having a plurality of steps (obtained in step 71); annotating the representations with data representing step attributes of each step of corresponding ones of the processes, to obtain the plurality of annotated remediation process descriptions (loop in which "accumulate attributes block 77 is performed); and calculating (as per block 74) the at least first attribute associated with the at least first candidate remediation process based on the annotated remediation process description associated with the at least first candidate remediation process. In a preferred form, the plurality of annotated remediation process descriptions are represented in annotated WS-BPEL, and the descriptions are further annotated with a scope of change table as shown in FIG. 8.

Further, in another aspect, the associating step discussed above after the description of FIG. 1 can include obtaining a given one of the annotated remediation process descriptions associated with the first candidate remediation process, as per block 71; initializing an index, as per block 72; determining whether an i-th flow element of the description is available, as per decision block 73; and, if the i-th flow element is available, retrieving and accumulating step attributes associated with the i-th flow element, as per blocks 76 and 77, and incrementing the index at block 78 and repeating the determining, retrieving and accumulating until all flow elements have been processed, as indicated by the arrow from block 78 to block 73. A further step in the associating step can include computing the first attribute associated with the first candidate remediation process, based on the step attributes associated with the flow elements, as per block 74. In some instances, a given one of the flow elements comprises a complex flow element, in which case the additional step of recursively invoking the initializing, determining, retrieving and accumulating, incrementing and computing steps can be performed for the complex flow element (for example, switch element 54).

Now that the process characterization procedure has been described, an exemplary form of the user interface 4 of FIG. 1 will be described, specifically, how the form of user interface is chosen and how the selected form is presented. This choice begins with the user interface presenting the attributes that are available. For example, it may be the case that attributes of execution time, cost, risk and scope of change are Available. If the remediation agent 5 of FIG. 1 chooses time and risk, the use interface software might then offer either a tabular or a graph-based choice interface, similar to that of FIG. 2 or 3, respectively. If the remediation agent chooses only scope of change, then a tabular or pictorial choice interface would be appropriate.

To assist in the operation of user interface 4 of FIG. 1, two tables can be defined. These are depicted in FIGS. 10 and 11. In the Attribute type Table of FIG. 10, two columns are defined. The attribute column 80 names each of the attributes upon which a remediation process choice may be based. The type column 81 classifies each attribute. For example, the last row of the Attribute type Table of FIG. 10 assigns a type of "pictorial" to the scope of change attribute. FIG. 11 depicts a Choice UI (user interface) type preferences Table, which may be customized to the preferences of each remediation agent. Three columns are defined in this table. The number column 82 contains the number of attributes selected by the remediation agent in support of a given remediation process choice. The attribute type column 83 lists the type of the attribute or attributes chosen, while the UI type column 84 lists the preferred presentation style. For example, the table of FIG. 11 indicates that the preferred presentation style for mole than two numeric attributes is tabular, while the preferred presentation style for exactly two numeric attributes is graph-based.

Many forms of this invention are possible. The remediation agent 5 in FIG. 1 may be a program rather than a human agent. Attributes other than those mentioned may be used to guide the decision process. The remediation process descriptions need not be in WS-BPEL, but may be in any computer-interpretable form. The process attributes created by the Characterize Process software may be reviewed and edited by humans before they are used for process choice. Process choice may be incremental: that is, a set of Candidate Remediation Processes may be generated and presented to the remediation agent for selection, but multiple selections) may be allowed. The system may then redo the diagnosis and remediation process choice based on eliminating certain remediation processes from consideration. The remediation agent may pursue a single remediation process, only to decide that before that process is put into effect its attributes are not acceptable and that process should be eliminated from further consideration.

It may also be the case, in one or more instances, that an initial remediation process is selected and monitored by the operator. At a certain point in the process a further choice may be presented to the operator based on the attributes of the remediation process so far (for example, if it has succeeded). The described procedure can then be re-invoked to determine process attributes relevant to this later choice. By way of further description of such an exemplary case, additional method steps would include receiving a selection of the at least first candidate remediation process; monitoring performance of the computer system with the at least first candidate remediation process implemented thereon; and causing the at least first candidate remediation process to pause, pending selection of a subsequent candidate remediation process. The re-invocation of the described procedure would then involve hypothesizing at least a second candidate remediation process for the problem from among the plurality of annotated remediation process descriptions, based at least in part on the performance monitoring; and associating at least a second attribute with the at least second candidate remediation process. At this point, presentation of the at least second candidate remediation process, with said associated second attribute, could be facilitated. The presentation would be to the remediation agent, as the subsequent candidate remediation process.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 12:
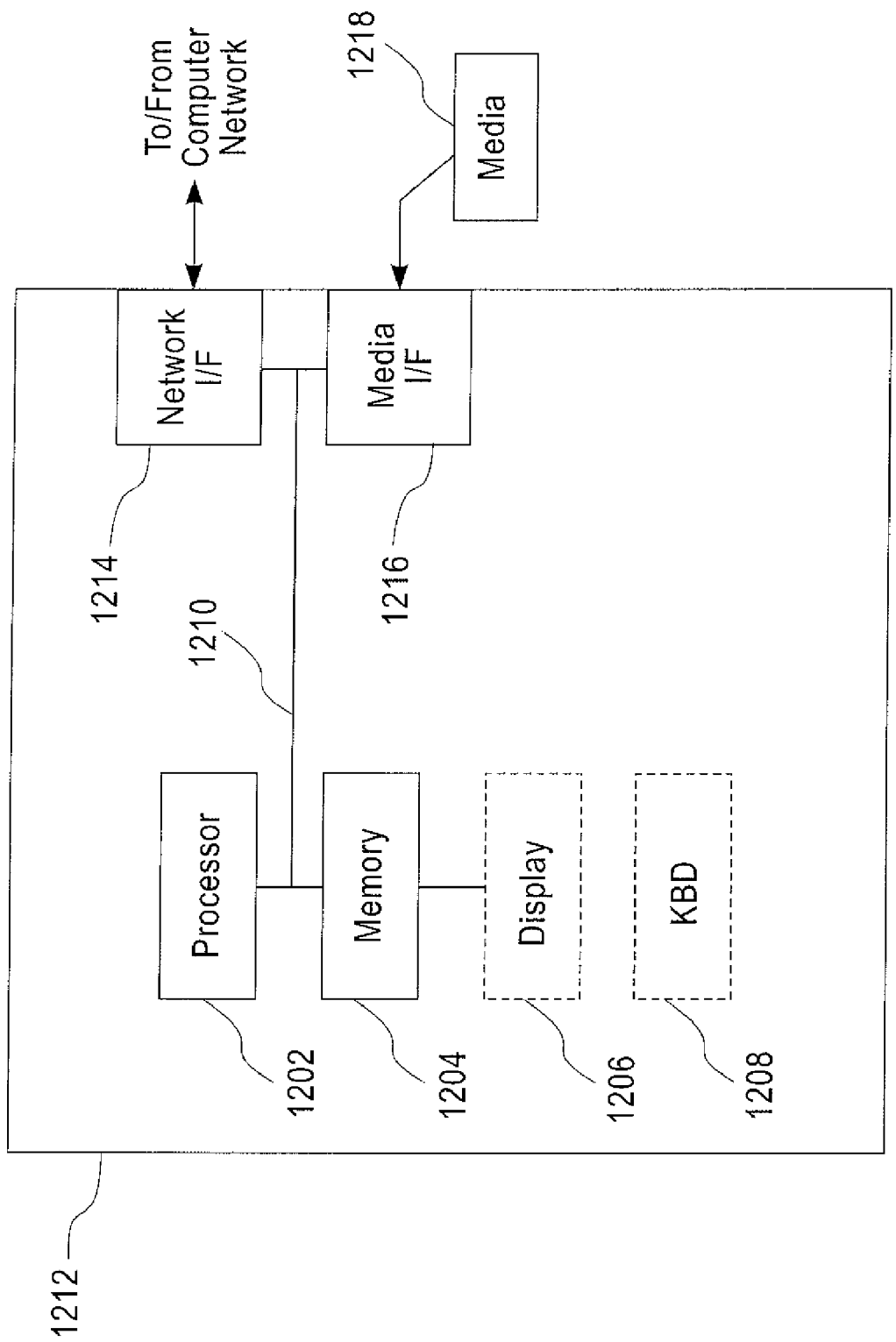
FIG. 12 depicts a computer system that may be useful in implementing one or more aspects and/or elements of the present invention.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (lead only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network inter face 1214, such as a network card, which can be provided to interface with a computer network, and to a media interface 1216, such as a diskette or CD-ROM drive, which can be provided to inter face with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1218) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 1204), magnetic tape, a removable computer diskette (for example media 1218), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1202 coupled directly or indirectly to memory elements 1204 through a system bus 1210. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for assisted remediation of at least one problem with a computer system, said method comprising the steps of:

obtaining data from said computer system, said data being indicative of said at least one problem;

hypothesizing at least a first candidate remediation process for said problem from among a plurality of annotated remediation process descriptions, based at least in part on said data, wherein said annotations comprise data representing step attributes of each step of corresponding ones of said processes;

associating at least a first attribute with said at least first candidate remediation process, wherein said at least first attribute is calculated based on said annotated remediation process description associated with said at least first candidate remediation process; and facilitating presentation of said at least first candidate remediation process with said associated attribute to a remediation agent.

2. The method of claim 1, wherein:

said hypothesizing step further comprises hypothesizing at least a second candidate remediation process for said problem;

said associating step further comprises associating at least a first attribute with said at least second candidate remediation process; and said facilitating step comprises facilitating presentation of said at least second candidate remediation process with said associated attribute;

further comprising the additional step of obtaining a selection of one of said first candidate remediation process and said second candidate remediation process, based on said presentation.

3. The method of claim 2, wherein said associating step further comprises associating at least a second attribute with said first candidate remediation process and at least a second attribute with said second candidate remediation process.

4. The method of claim 3, wherein said remediation agent comprises a human remediation agent, and wherein said facilitating presentation comprises facilitating display.

5. The method of claim 4, further comprising the additional step of obtaining, from said human remediation agent, an attribute selection for display.

6. The method of claim 5, wherein said first and second attributes associated with said first candidate remediation process and said first and second attributes associated with said at least second candidate remediation process each comprise one of cost, time, risk, and scope of change.

7. The method of claim 6, wherein said step of facilitating display comprises facilitating display in one of a text-based form, a graph-based-form, and a pictorial form, based at least in part on said attribute selection by said human remediation agent.

8. The method of claim 1, wherein said plurality of annotated remediation process descriptions are represented in annotated WS-BPEL.

9. The method of claim 8, wherein said associating step comprises:
   obtaining a given one of said annotated remediation process descriptions associated with said first candidate remediation process;
   initializing an index;
   determining whether an i-th flow element of said description is available;
   if said i-th flow element is available, retrieving and accumulating step attributes associated with said i-th flow element;
   incrementing said index and repeating said determining, retrieving and accumulating until all flow elements have been processed; and
   computing said first attribute associated with said first candidate remediation process based on said step attributes associated with said flow elements.

10. The method of claim 9, wherein a given one of said flow elements comprises a complex flow element, further comprising the additional step of recursively invoking said initializing, determining, retrieving and accumulating, incrementing and computing steps for said complex flow element.

11. The method of claim 1, further comprising the additional step of annotating said remediation process descriptions when initially adding said descriptions to a database.

12. The method of claim 1, further comprising the additional step of annotating said remediation process descriptions when a given one of said descriptions is selected as said candidate remediation process.

13. The method of claim 1, further comprising the additional steps of:
   representing a plurality of problem remediation processes in computer-interpretable form to obtain a plurality of representations each having a plurality of steps;
   annotating said representations with said data representing step attributes of each step of corresponding ones of said processes, to obtain said plurality of annotated remediation process descriptions; and
   calculating said at least first attribute associated with said at least first candidate remediation process based on said annotated remediation process description associated with said at least first candidate remediation process.

14. The method of claim 13, wherein said plurality of annotated remediation process descriptions are represented in annotated WS-BPEL, and wherein said descriptions are further annotated with a scope of change table.

15. The method of claim 1, wherein only said first candidate remediation process is hypothesized and presented, and wherein a human remediation agent decides whether to implement said candidate remediation process, based at least in part on said display.

16. The method of claim 1, further comprising the additional steps of:
   receiving a selection of said at least first candidate remediation process;
   monitoring performance of said computer system with said at least first candidate remediation process implemented thereon;
   causing said at least first candidate remediation process to pause, pending selection of a subsequent candidate remediation process;
   hypothesizing at least a second candidate remediation process for said problem from among said plurality of annotated remediation process descriptions, based at least in part on said performance monitoring;
   associating at least a second attribute with said at least second candidate remediation process; and
   facilitating presentation of said at least second candidate remediation process, with said associated second attribute, to said remediation agent, as said subsequent candidate remediation process.

17. A computer program product comprising a tangible computer readable recordable storage medium including computer usable program code for assisted remediation of at least one problem with a computer system, said computer program product including:
   computer usable program code for obtaining data from said computer system, said data being indicative of said at least one problem;
   computer usable program code for hypothesizing at least a first candidate remediation process for said problem from among a plurality of annotated remediation process descriptions, based at least in part on said data, wherein said annotations comprise data representing step attributes of each step of corresponding ones of said processes;
   computer usable program code for associating at least a first attribute with said at least first candidate remediation process, wherein said at least first attribute is calculated based on said annotated remediation process description associated with said at least first candidate remediation process; and
   computer usable program code for facilitating presentation of said at least first candidate remediation process with said associated attribute to a remediation agent.

18. The computer program product of claim 17, wherein:
   said computer usable program code for hypothesizing further comprises computer usable program code for hypothesizing at least a second candidate remediation process for said problem;
   said computer usable program code for associating further comprises computer usable program code for associating at least a first attribute with said at least second candidate remediation process; and
   said computer usable program code for facilitating comprises computer usable program code for facilitating presentation of said at least second candidate remediation process with said associated attribute;
   further comprising computer usable program code for obtaining a selection of one of said first candidate remediation process and said second candidate remediation process, based on said presentation.

19. The computer program product of claim 18, wherein said computer usable program code for associating further comprises computer usable program code for associating at least a second attribute with said first candidate remediation process and at least a second attribute with said second candidate remediation process.

20. The computer program product of claim 17, further comprising:
   computer usable program code for representing a plurality of problem remediation processes in computer-interpretable form to obtain a plurality of representations each having a plurality of steps;
   computer usable program code for annotating said representations with said data representing step attributes of each step of corresponding ones of said processes, to obtain said plurality of annotated remediation process descriptions; and computer usable program code for calculating said at least first attribute associated with said at least first candidate remediation process based on said annotated remediation process description associated with said at least first candidate remediation process.

21. An apparatus for assisted remediation of at least one problem with a computer system, said apparatus comprising:

a memory; and at least one processor coupled to the memory and operative to:

obtain data from said computer system, said data being indicative of said at least one problem;

hypothesize at least a first candidate remediation process for said problem from among a plurality of annotated remediation process descriptions, based at least in part on said data, wherein said annotations comprise data representing step attributes of each step of corresponding ones of said processes;

associate at least a first attribute with said at least first candidate remediation process, wherein said at least first attribute is calculated based on said annotated remediation process description associated with said at least first candidate remediation process; and facilitate presentation of said at least first candidate remediation process with said associated attribute to a remediation agent.

* * * * *